United States Patent
Dawson et al.

(10) Patent No.: US 10,695,679 B2
(45) Date of Patent: *Jun. 30, 2020

(54) INTERACTIVE VIDEO GAME METHOD AND SYSTEM

(71) Applicant: DISNEY ENTERPRISES, INC., Burbank, CA (US)

(72) Inventors: C. Matthew Dawson, Highland, UT (US); Emily Tyndall, Draper, UT (US); Kristin Mae Yee, Salt Lake City, UT (US); David Neil Christenson, Salt Lake City, UT (US); Edward Gilmore Martin, Salt Lake City, UT (US); James Patrick Rowe, Herriman, UT (US); Casey Shane Nelson, Sandy, UT (US); Jamison R. Titera, Bountiful, UT (US); Paul Mombourquette, Los Angeles, CA (US); Rich Reagan, South Jordan, UT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/845,102

(22) Filed: Dec. 18, 2017

(65) Prior Publication Data
US 2018/0104597 A1  Apr. 19, 2018

Related U.S. Application Data

(63) Continuation of application No. 12/187,119, filed on Aug. 6, 2008, now Pat. No. 9,844,730.

(Continued)

(51) Int. Cl.
*A63F 13/00* (2014.01)
*A63F 13/814* (2014.01)
(Continued)

(52) U.S. Cl.
CPC .......... *A63F 13/814* (2014.09); *A63F 13/211* (2014.09); *A63F 13/212* (2014.09)

(58) Field of Classification Search
CPC .................. A63B 2024/0096; A63B 2220/803
See application file for complete search history.

(56) References Cited

U.S. PATENT DOCUMENTS 7,128,649 B2  10/2006  Nobe et al.
7,833,099 B2  11/2010  Sato et al.
(Continued)

OTHER PUBLICATIONS

Ekberg, "Hannah Montana: Spotlight World Tour Hands on", http://www.gamespot.com/wii/action/hannahmontana2/news.html (Jun. 19, 2007), 2 pages.

*Primary Examiner* — Omkar A Deodhar
*Assistant Examiner* — Eric M Thomas
(74) *Attorney, Agent, or Firm* — Dorsey & Whitney LLP (57) ABSTRACT

One particular implementation of the present invention may take the form of a method and apparatus for providing various movements as input to a video game. The method and apparatus may detect the body movements of a video game player and interpret those movements as inputs to the video game. The video game may then compare the movements of the user to expected movements to determine if the correct movement was performed by the user. The video game may also display a video game environment that instructs and interacts with the user to perform several movements of the video game. In this manner, the method and apparatus may provide a move realistic and dynamic video game experience than previous video games that only allowed the player to press buttons as inputs to the game.

22 Claims, 4 Drawing Sheets

Related U.S. Application Data

(60) Provisional application No. 61/132,291, filed on Jun. 16, 2008.

(51) Int. Cl.
*A63F 13/211* (2014.01)
*A63F 13/212* (2014.01)

(56) References Cited

U.S. PATENT DOCUMENTS

| | | |
|---|---|---|
| 2001/0004861 A1 | 6/2001 | Suzuki |
| 2002/0025842 A1 | 2/2002 | Nobe et al. |
| 2002/0055383 A1 | 5/2002 | Onda et al. |
| 2002/0160823 A1 | 10/2002 | Watabe et al. |
| 2006/0252474 A1 | 11/2006 | Zalewski et al. |
| 2006/0264260 A1* | 11/2006 | Zalewski ................ A63F 13/06 463/36 |
| 2007/0256546 A1* | 11/2007 | Hikino .................. G10H 1/348 84/615 |
| 2008/0171596 A1 | 7/2008 | Hsu |
| 2008/0207325 A1 | 8/2008 | Hsu |
| 2008/0242385 A1 | 10/2008 | Miyamoto |
| 2008/0316863 A1* | 12/2008 | Walley ................. A63F 13/235 367/135 |
| 2009/0258704 A1 | 10/2009 | Asami |

* cited by examiner

INTERACTIVE VIDEO GAME METHOD AND SYSTEM

CROSS REFERENCE TO RELATED APPLICATIONS

This application is a continuation of U.S. patent application Ser. No. 12/187,119 titled "Method and Apparatus for an Interactive Dancing Video Game" and filed Aug. 6, 2008, which claims priority under 35 U.S.C. § 119(e) from U.S. Provisional Patent Application No. 61/132,291 titled "Method and Apparatus for Interactive Dancing Video Game" and filed Jun. 16, 2008, both of which are hereby incorporated by reference herein in their entireties.

TECHNICAL FIELD

Aspects of the present invention relate to video games. More particularly, aspects of the present invention involve a method and apparatus for a dancing video game employing multiple dance movements by the user as inputs to the video game.

BACKGROUND

In-home video games and video game systems are common place in today's market. Such systems allow a user to play video games at home on a standard television set or on a handheld device that the user may carry with him. Typically, in-home video game systems include a console that reads the video game code from a storage device (i.e. a CD-ROM disc or cartridge) and transmits the video to a television screen for display. Video game systems also typically include a controller device that allows a player of the video game to provide inputs to the video game to manipulate the characters, racecars, or other features of the game.

Some video games allow the video game player to dance along with the video game. Dancing video games typically have the player provide an input to the game that indicates the player is on beat with the music playing. For example, some video games may provide a floor mat with several buttons that a player of the video game may stand on as an input to the video game. The floor mat allows the player to press buttons with their feet to provide inputs to the video game to the beat of the music playing as part of the game. Other dancing video games have the players press buttons in beat with the video game through a handheld controller.

SUMMARY

As shown above, dancing video games are often limited to the player of the game pressing buttons to interact with the video game. These types of interfaces with a dancing video game do not provide the user with a fully immersive dancing experience when playing the video game. Thus, what is needed is a method and apparatus for a dancing video game that allows the user of the video game to use more realistic dance movements as a gameplay mechanic, among other things.

One embodiment may take the form of a method for a movement tracking video game. The method may include receiving by a processing element a movement input from a controller moved by a user, the movement input corresponding to a body movement of the user. The method may also include determining by the processing element whether the body movement of the user matches an expected movement. The determining operation may include analyzing the movement input from the controller to determine a peak vector and comparing the peak vector to an ideal vector, the ideal vector corresponding to the expected movement. The method may also include outputting by the processing element to a display an indicator of whether the body movement matches the expected movement.

Another embodiment may take the form of a movement tracking video game system. The system may include a controller movable by a user, a display, and a processing element in electrical communication with the controller and the display. The processing element may perform a series of operations. The operations performed by the processing element may include receiving a movement input from the controller, the movement input corresponding to a body movement of the user that moves the controller. The operations may also include determining whether the body movement of the user matches an expected movement by analyzing the movement input from the controller to determine a peak vector and comparing the peak vector to an ideal vector corresponding to the expected movement. If the peak vector matches the ideal vector, the operations may include determining that the body movement of the user matches the expected movement. If the peak vector does not match the ideal vector, the operations may include determining that the body movement of the user does not match the expected movement. The operations may also include outputting to the display an indicator of whether the body movement matches the expected movement.

SPECIFICATION

One particular implementation of the present invention may take the form of a method and apparatus for providing various dance movements as input to a dancing video game. The method and apparatus may detect the hand and arm movements of a video game player and interpret those movements as inputs to the video game. The video game may then compare the dancing movements of the user to expected dance movements to determine if the correct dance movement was performed by the user. The video game may also display a video game environment that instructs and interacts with the user to perform several dance movements of the video game. In this manner, the method and apparatus may provide a more realistic and dynamic dancing video game experience than previous dancing video games that only allowed the player to press buttons as inputs to the game.

Figure 1:
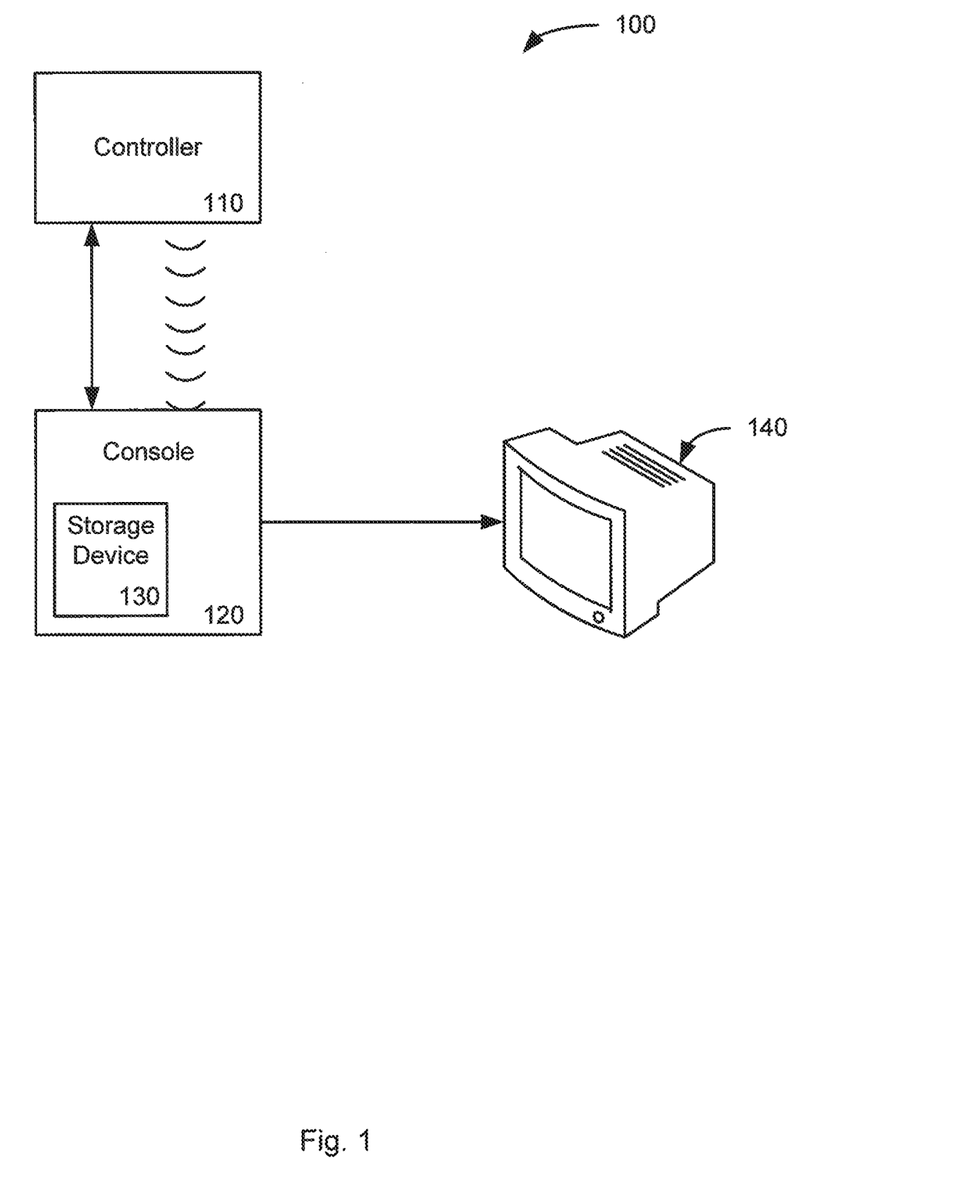
FIG. 1 is a block diagram illustrating a video game system.

FIG. 1 is a block diagram illustrating a video game system. The video game system 100 may include a controller 110, a console 120, a storage device 130, and a display device 140. It should be noted that the video game system depicted in FIG. 1 is illustrative only. Alternative embodiments of a video game system may add components, omit components, or may change the configuration of the in which the components are connected.

The video game system 100 depicted is one example of a video game system that may be configured in accordance with the embodiments described herein. A dancing video game conforming with aspects of this disclosure may be implemented in or otherwise deployed on any computing platform that provides a user-interaction with a video game, including in-home video game consoles that attach to a television, a personal computer including a memory device with code configured in accordance with the present disclosure, handheld video game consoles, mobile phones, personal digital assistants, music or audio players, and so on. Accordingly, a "video game system" as used herein, encompasses all such devices configured in accordance with the present disclosure and any other device that allows a user to interact and play with a dancing video game.

The video game system 100 may include a controller device 110 or several controller devices. A controller 110 of a video game system may allow a user or player to provide inputs to the video game system to control the various characters and features of the video game. The controller may connect to a video game console 120 by plugging the controller 110 directly into the console 120 or the controller 110 may connect wirelessly. Further, in video game systems that are handheld, the controller may be built directly into the console device. The controller device 100 to the video game system may include, but is not limited to, a controller containing a directional pad and a series of buttons, a joystick, a tablet device, a mouse, and so on. The controller may also contain accelerometers to measure the movement of the controller by the user. For example, the controller may measure when the user of the video game system moves the controller in a circular motion.

The video game console 120 may provide many functions for the video game system. The console 120 may accept and interpret the inputs being provided by the user through the video game controller 110. The console 120 may also provide the display output to a display device 140. Further, the console 120 may accept and interpret the video game code from a storage device 130 in which the code may be stored. In this manner, the console 120 may be similar in design and functionality as a typical home computing system. Accordingly, a "console" as used herein, encompasses all such devices that may provide a platform through which a user of the video game system may interact and play a video game.

The video game code may be written in any computer-readable medium and stored on any computer-readable storage device 130, including optical disks, flash media, floppy disks, hard drives and so on. The video game code may be read by the console from the storage device 130 during game play to provide the computer-generated environment in which the players interact. Accordingly, a "video game" as used herein, encompasses any dancing video game that may be played on a video game system.

The video game system 100 may also include a display device 140. For in-home video game systems, the display device 140 may be a television set, including cathode-ray tube (CRT), plasma, and liquid crystal display (LCD) televisions. For handheld video game systems, the display device 140 may be contained within the handheld device and may include plasma and LCD-type screens. For video game systems embodied in a personal computer, the display device 140 may be a monitor connected to the personal computer. Accordingly, a "display device" as used herein, encompasses all such display devices that provides a visual representation of the video game.

Figure 2:
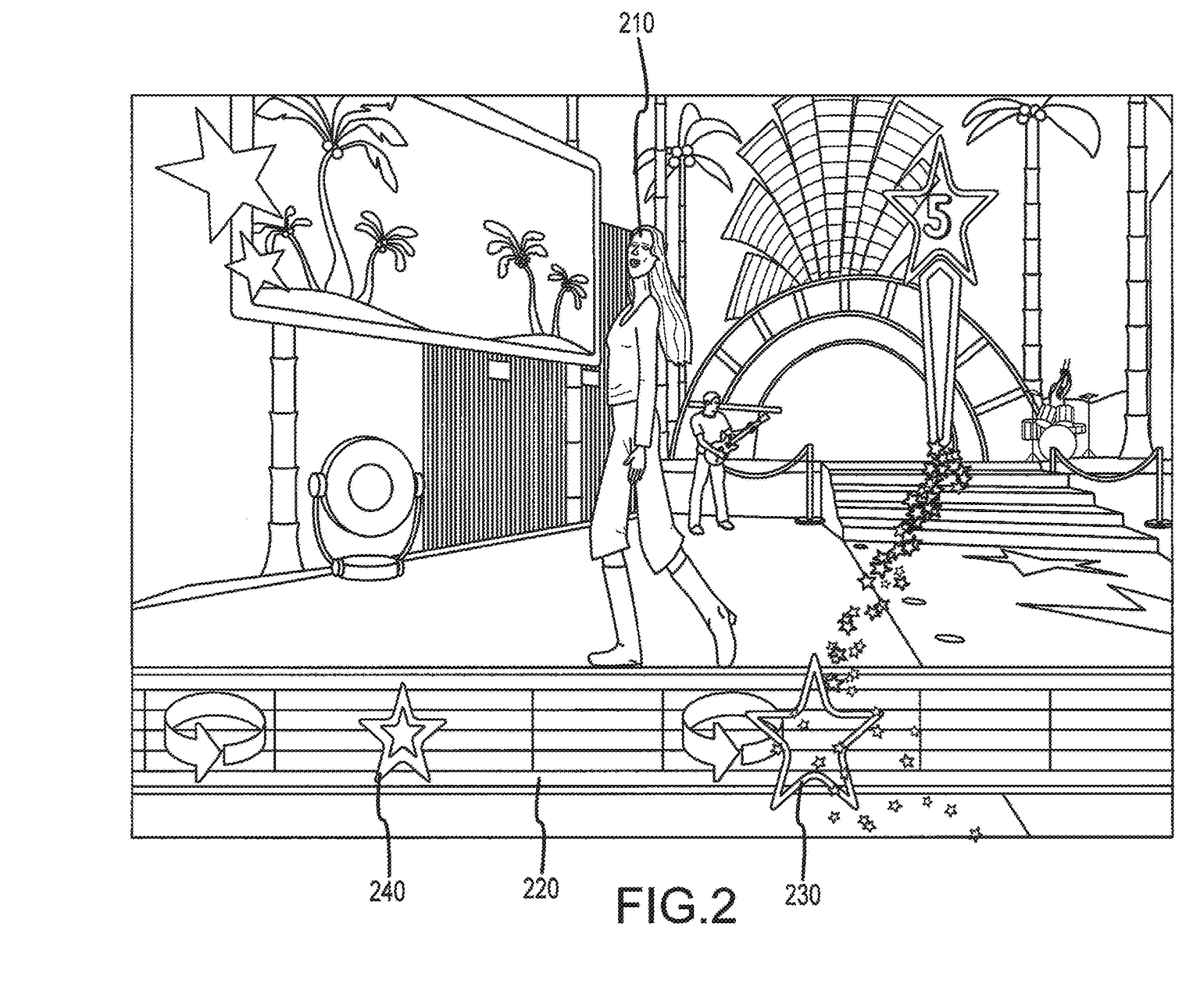
FIG. 2 depicts a screen shot of a dancing video game that may incorporate various movements of the video game user as inputs to the video game.

FIG. 2 depicts a screen shot of a dancing video game that may incorporate various movements of the video game user as inputs to the dancing video game. The video game environment may display to the user a visual interface through which the user may interact with the video game. The display may provide indicators and instructions to the user to perform specific dance movements. The video game may also provide an audio interface to the user, such as a song that the user may dance to during gameplay and audio instructions on how to perform each dance movement. Any environment suitable to provide the user with an interface to interact with the video game may be presented to the video game user.

To aid in the user interacting with the video game to perform specific dance movements, the video game environment may also include an on-screen character 210. The on-screen character 210 may provide a model that the user of the video game may emulate to perform the dance movement inputs. For example, the on-screen character 210 may instruct the video game user on how to perform certain dance movements that the video game will recognize before gameplay begins. One example of a dance movement may include the user raising his right arm in the air. Thus, the on-screen character 210 may demonstrate to the user the dance movement of raising his right arm. During gameplay, the user of the video game may then synchronize their dancing movements with the on-screen character 210 to provide the inputs to the dancing video game, essentially emulating the on-screen character.

In another embodiment, the user of the video game may control the actions of the on-screen character 210. For example, as described in more detail below, the video game may detect and interpret arm and hand movements of the video game user. The video game may then move the on-screen character 210 to mirror the detected movements of the user. In this manner, the user of the video game may use their movements to control the movements of the on-screen character 210. Through the above described interactions, the on-screen character 210 may provide a visual interface to the user for the video game to further aid the user in interacting with and enjoying the video game.

The video game environment may also include several icons to indicate to the user of the video game the expected dance movements to be performed by the user during gameplay. The icons may be presented to the user through the visual display. As described in more detail below with respect to FIG. 3, each icon may represent a distinct dance movement that the user may perform to interact with the video game. For example, the environment may include a star icon 240. The star icon 240 may indicate to the video game user to put the user's right hand in the air above the user's head. Several icons may thus be provided to the user to represent several dance movements. In this manner, the icons of the video game environment may represent dance movements that may be performed by the user to interact with the video game.

The video game environment may also include a movement bar 220 to indicate to the user a series of dance movements expected to be performed by the user to interact with the video game. Further, the movement bar 220 may scroll the dance icons across the movement bar 220 to indicate to the user when to perform the represented dance movements. For example, the movement bar 220 may include a designation point 230 that indicates to the user of the video game when the certain dance movements represented by the icons may be performed. As a dance icon scrolls across the movement bar 220, the user is made aware that the dance movement the icon represents is expected by the video game soon. The user may then perform the dance movement represented by the icon when the icon reaches the designation point 230. For example, as explained above, the star icon 240 indicates to the user to raise one hand into the air. The star icon 240 may start on the left side of the screen and scroll across the movement bar 220 to the right, approaching the designation point 230. The speed at which the icon 240 scrolls across the movement bar 220 may depend on the difficulty level of the video game. When the star icon 240 reaches the designation point 230, the user is expected by the video game to raise one hand in the air. If the user performs the correct movement as detected by the video game controller at the correct time, the video game may award the user a certain amount of points. By scrolling several icons across the movement bar 220, the video game may provide a series of dance movements to the user to perform. In this manner, the user of the video game may perform the series of expected dance movements as input to the video game, incurring points for each correct movement.

The points given to the user by the video game may be collected to advance to a more difficult level or to compare with other players of the video game. More difficult levels may include more difficult dance movements. Further, the more difficult levels may scroll the icons representing the dance movements across the movement bar 220 at a faster rate, requiring the user to perform the dance movements quicker than before to collect the points. Also, the arrival of the icons may correlate to the beat of a song associated with the video game such that the user of the video game may perform the dance movement inputs synchronized to the beats of the music. Synchronizing the dance movements of the user with a song may further provide a more dynamic experience for the user of the dancing video game.

Figure 3:
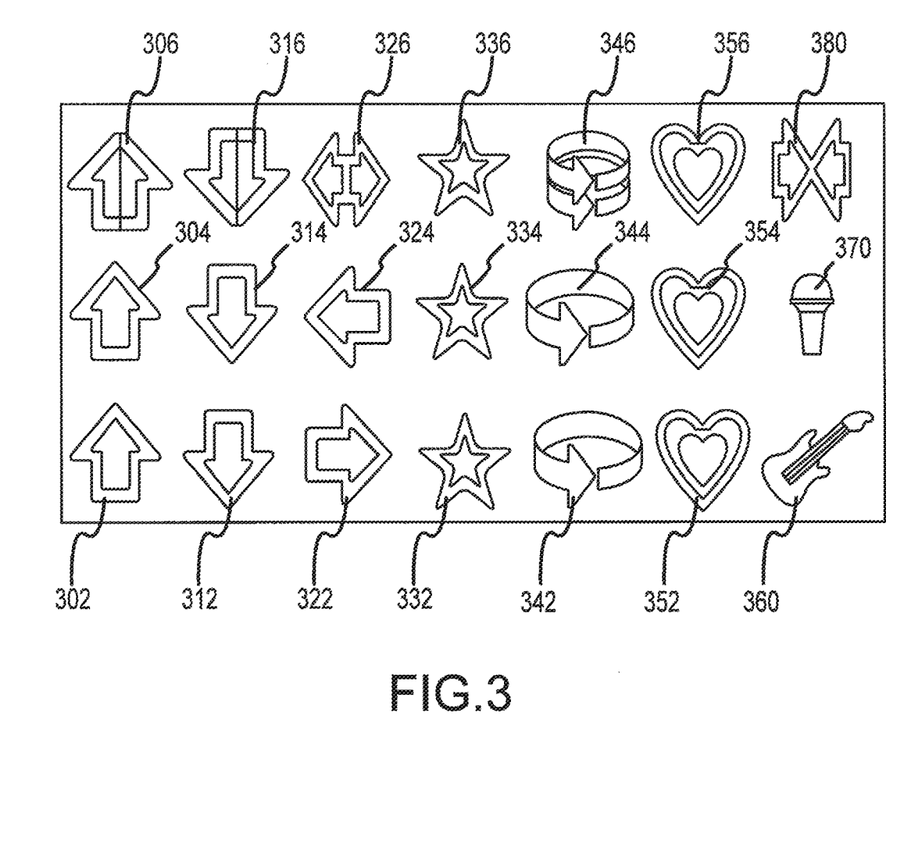
FIG. 3 is a diagram illustrating a collection of icons that may be used by a dancing video game to indicate different dancing movements to use as inputs to the video game.

As explained above, the video game may include several icons that represent certain dance movements recognized by the video game. FIG. 3 is a diagram illustrating a collection of icons that may be used by a dancing video game to indicate different dancing movements to use as inputs to the video game. While several icons are presented, it should be appreciated that the video game may include any number of icons of varying size and color representing various dance movements. Further, the dance movements represented by the icons may include any body movements, including but not limited to, arm movements, leg movements, full-body movements (such as spins or jumps) and head movements.

The icons depicted in FIG. 3 represent arm movements that may be recognized by the video game. For example, an up-arrow icon 302 of a certain color may be presented to the user by the video game. The up-arrow icon 302 may indicate to the video game user to raise their left arm. Another up-arrow icon 304 of a different color may indicate to the user to raise their right arm. Still another up-arrow icon 306 may indicate to the user to raise both arms at the same time. As described in more detail below, the controller of the video game system may recognize the movements of both arms of the user during gameplay.

Similar icons may indicate to the user to perform other dance movements. For example, a down arrow icon 312 may guide the user to lower his right arm. Another down arrow 314 of a different color may instruct the user to lower his left arm. Still another down arrow 316 may indicate to the user to lower both arms. An arrow pointing left 324 may indicate to the user to move their left arm outward. A similar right-pointing arrow 322 and right may indicate to the user to move his right arm outward. Another icon 326 may instruct the user to move both arms outward. A star icon 332 may indicate may indicate to the user to move his right arm to point forward. A similar star icon 334 with a different color may instruct the user to move his left arm forward and a third star icon 336 may indicate the user to move both arms forward. A swirl icon 342 may indicate to the user to move the right hand in a circular motion. A second swirl icon 344 may indicate to the user to move the left hand in a circular motion. A third swirl icon 346 may indicate to the user to move both hands in a circular motion. A heart icon 352 may indicate to the user to place the right hand over the user's heart. A second heart icon 354 of a different color may indicate to the user to place the left hand over the user's heart. A third heart icon 356 may indicate to the user to place both hands over the user's heart. Each of these dance movements may have one icon indicating to the video game user to move the left hand or arm as instructed, one icon indicating to move the right hand or arm and a third indicating the user to move both hands or arms. As these icons are scrolled across the movement bar described in FIG. 2, the user may perform the various hand movements in beat with the video game. Thus, the user may interactively dance to the video game by performing the dancing movements indicated by the icons.

Other icons may represent movements not generally associated with dancing movements. For example, a guitar icon 370 may guide the user to perform a strumming motion with one hand. Similarly, a microphone icon 370 may guide the user to hold the video game controller as if it were a microphone. Still another icon 380 shaped like two arrows pointing towards each other may indicate to the user to clap with both hands. These movements may be incorporated into the video game along with the arm dancing movements described above.

The dance movements that each icon represents may be explained to the user of the video game prior to gameplay. For example, the on-screen character described with reference to FIG. 2 may inform the user as to which dance movement is represented by each icon, perhaps by participating in a training level of the video game. Alternatively, the icons and a description of the dance movement associated with each icon may be included in an instruction booklet that accompanies the video game. Once the video game user is aware of which dance movements each icon represents, the user may interact with the dancing video game.

Although the movements described above are generally arm and hand movements, it should be noted that the icons may represent other dancing movements. For example, the controller of the video game may also recognize leg movements of the user. In this configuration, the video game may provide icons that represent both leg and arm movements. Similar icons may indicate to the user to perform full-body or head movements. These other movements may be detected by other video game controllers attached to or otherwise configured to detect the various body movements. In this manner, the video game may guide the user through a series of dancing movements such that the user may interact with the video in a more dynamic and realistic way. This may provide the user with the immersive feeling of actually dancing and performing as the on-screen character of the video game.

In order for the user to interact with a dancing video game through hand and arm movements, the video game controller may be configured such that the controller may detect hand and arm movements of the user. As described in more detail below, to detect the movements of the user, the controller may include at least one accelerometer located within the controller to detect the acceleration and movement of the video game hands as the user holds the controller. Thus, the user may use the controller to input the various dance movements recognized by the video game.

As described, the video game controller may detect the acceleration and movement of the controller by the user. For example, the controller may be designed to fit into one hand of the video game user and may contain a three dimensional accelerometer. A second controller may be designed to fit into the user's other hand and may also contain a three dimensional accelerometer. The accelerometer of the controllers may measure change in velocity of the controller, also known as acceleration. Through the accelerometers, the video game may be able to read the acceleration values at successive time intervals from each controller.

Further, because the controller measures accelerations in three dimensions, there may be three separate data values that can be read each time the controller provides a measurement to the video game. These values may indicate the amount of acceleration along the three axes: up/down, right/left and forward/backward. A forward motion may register as acceleration in the forward direction of the forward/backward axis. Likewise, a sideways motion may register as acceleration along the sideways axis. An upward acceleration followed by a downward acceleration may correspond to the motion of the players hand moving upwards (the upward acceleration) followed by the hand slowing to a stop (the downward acceleration), indicating that the user has moved the controller above the user's head.

The dancing video game may use the data points provided by the controller as the user moves the controller through the user's space to determine whether the user has performed the expected dance movement. For example, the video game may be expecting the user to raise her right arm in response to the video game. The controller may provide data points to the video game system as the user raises her right arm. The video game may compare the path of data points provided by the controller during the movement by the user to an expected path of data points, as explained in more detail below. If the data points do not match, then the video game may assume that the user performed the wrong movement with the controller. If the data points match, the video game may assume the user performed the correct movement with the video game controller.

To compare the measured dance movement to an expected dance movement, a database may be stored by the video game that contains an entry for each dance move. The data contained in the entry for each dance move may describe ideal input values that will be compared against the player's actual measured accelerometer input data. However, the way a certain user holds the controllers varies somewhat from person to person, as does the motions they may perform. Therefore, it is not required that the measured acceleration values match exactly with the ideal input values stored in each dance move data entry. Instead, a simple heuristic rule described below may be used to determine if the measured values match closely enough to the ideal values.

As the user interacts with the game, each measured data value may be recognized and recorded by the video game as they are read in from the controller. As each measured data value is recorded the game may compare the current values to the previous values read in and look for peak values in the data. This may be done for each axis individually as well as for the combined axes. To find a peak in the data, the video game may analyze the magnitude of each value read and locate the samples that have the largest magnitudes. Since each axis is bidirectional these magnitudes can be in either of the two directions for the given axis. The video game may then record when the peaks occurred and what their magnitudes were. The recorded peak values may then be compared to one or more recent peaks that may be considered ideal values. This comparison may compare a single axis, two axes, or all three axes depending on the dance move. If the difference between the peaks is within a certain threshold of the ideal value, then the video game may consider the measured dance movement as a match.

If the ideal value combines two or more axes, the video game may combine the axes to create a two or three dimensional vector and then find the angle between the ideal vector value and the measured peak vector. To be considered a match, the angle between the peak vector and the ideal vector may be below a certain threshold. Since the user may hold the controller differently, there may be more than one set of ideal values for any given dance move. Some dance moves look for a single peak and match against a single ideal value. Some dance moves look for two or more peaks in sequence that match two or more ideal values. When the time elapses for performing a given dance move, if the player has not performed a motion that produces peaks near enough to the ideal values, the video game may consider that dance move has been missed.

In addition, some dance moves may have rules that include detecting that no peaks above a specified magnitude occurred on one or more axes. For example, if the dance motion is supposed to be performed in an up/down motion, the video game may require that any measured acceleration on the right/left axis be below a specified threshold since the motion we are looking for should not include much side to side movement.

Finally, some dance moves may require that the controller be held still and in a certain orientation. In this case, the video game may not look for peaks at all. Instead, the game may make sure the magnitude of the accelerations on all axes is below the threshold specified in the dance move database for the move. The game may also make sure that the average acceleration is within the required threshold, also specified in the dance move database. Through these rules, the measured dance movement of the user may be compared to an expected dance movement to determine whether the user has performed the proper dance movement.

Figure 4:
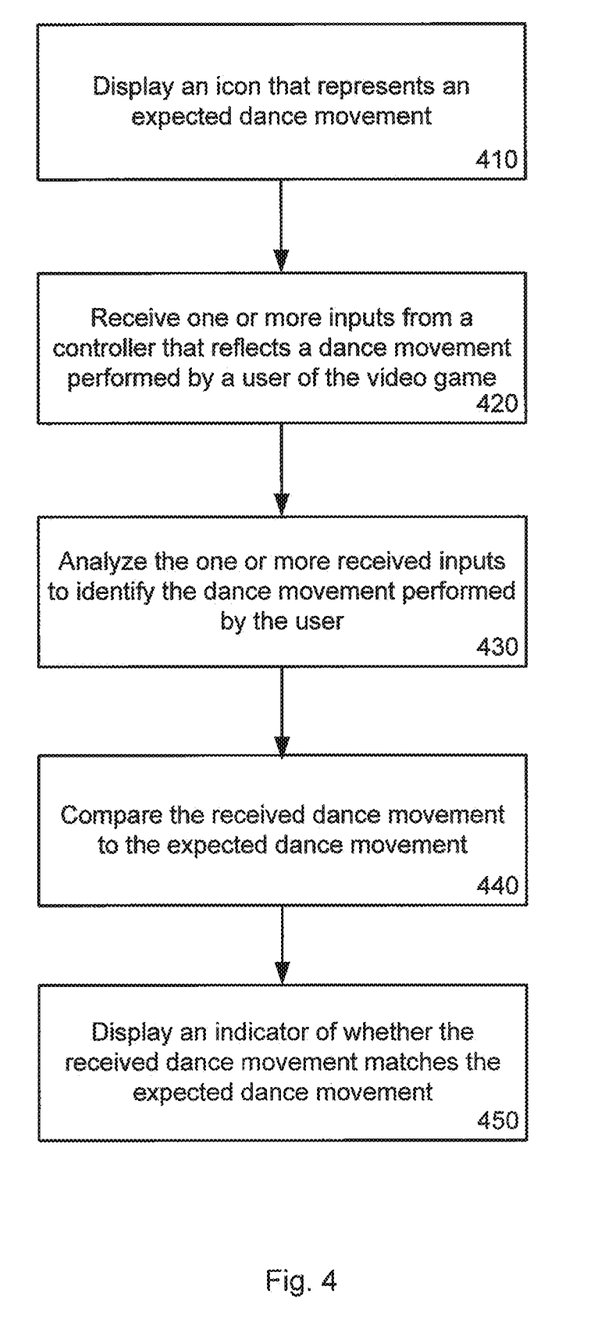
FIG. 4 is a flowchart of one embodiment for an interactive dancing video game that may incorporate various movements of the video game user as inputs to the video game.

FIG. 4 is a flowchart of one embodiment for an interactive dancing video game that may incorporate various movements of the video game user as inputs to the video game. The method may allow a user of the video game to interact with the dancing video game by performing dance movements in response to a cue given by the video game display.

The embodiment may begin in operation 410 by presenting an icon to the video game user through a visual interface, such as a video game environment that includes the icon. The icon may represent a dance movement that the user may perform in response to the presentation of the icon. In operation 420, the user of the video game may perform a dance movement in response to the icon displayed. The dance movement of the user may be detected by a video game controller. The video game controller may provide one or more inputs to the video game that reflect the dance movement performed by the user.

In operation 430, the inputs received from the video game controller may be analyzed by the video game to identify the dance movement performed by the user. As explained above, the inputs provided by the controller to the video game may include a series of data points. These points may be analyzed by the video game to construct a single dance movement performed by the user.

In operation 440, the received dance movement of the user through the controller may be compared to an expected dance movement by the video game. As described above, the series of data points representing the dance movement performed by the user may be compared to a stored set of data points representing the dance movement expected by the video game. As also explained above, the comparison of the measured movement and the expected movement does not have to be exact. Rather, the measured movement may approximate the expected movement and the video game may still recognize the measured movement.

In operation 450, the video game may present an indication to the user whether the measured dance movement correlated to the expected dance movement. For example, the video game may award the user with points for a successful performance of a dance movement. Another indicator may include displaying an encouraging message within the video game environment. In any event, the user of the video game may receive an indication that he/she performed a correct dance movement. The above described process may be repeated many times during the gameplay of the video game.

It should be noted that the flowchart of FIG. 4 is illustrative only. Alternative embodiments may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for a movement tracking video game, the method comprising:
   receiving by a processing element a movement input from a controller moved by a user, the movement input corresponding to a body movement of the user;
   determining by the processing element whether the body movement of the user matches an expected movement by:
      analyzing the movement input from the controller to determine a peak vector; and
      comparing the peak vector to an ideal vector, the ideal vector corresponding to the expected movement; and
   outputting by the processing element to a display an indicator of whether the body movement matches the expected movement.

2. The method of claim 1, wherein the body input corresponds to at least one of an arm movement of an arm of the user, a hand movement of a hand of the user, a head movement of a head of the user, or a leg movement of a leg of the user.

3. The method of claim 1, further comprising receiving by a processing element, a second movement input from a second controller moved by a user, the second movement input corresponding to a second body movement of the user.

4. The method of claim 1, further comprising displaying on the display an interface to the user during gameplay.

5. The method of claim 4, wherein the interface indicates to the user the expected movement to be performed.

6. The method of claim 5, wherein, when the processing element indicates that the body movement matches the expected movement, the interface indicates to the user whether the body movement was correct or incorrect.

7. The method of claim 4, wherein the interface comprises an avatar that mirrors the body movement of the user to provide visual indication to the user whether the body movement matches the expected movement, wherein movement of the avatar is determined by the movement input received from the controller.

8. The method of claim 1, wherein the determining operation comprises a heuristic technique to determine whether the body movement of the user matches the expected movement.

9. The method of claim 1, wherein the comparing operation comprises:
   determining the angle between the peak vector and the ideal vector; and
   determining whether the angle between the peak vector and the ideal vector is below a predetermined threshold, wherein if the angle between the peak vector and the ideal vector is below the predetermined threshold, the processing element outputs to the display an indicator that the body movement matches the expected movement.

10. The method of claim 1, wherein the determining operation further comprises recording by the processing element peak values in the movement input from the controller.

11. The method of claim 10, wherein the comparing operation comprises comparing a single peak value in the movement input against a single ideal value for the expected movement.

12. The method of claim 10, wherein the comparing operation comprises comparing two or more peak values in the movement input in sequence against two or more ideal values for the expected movement.

13. A movement tracking video game system, the system comprising:
   a controller movable by a user;
   a display; and
   a processing element in electrical communication with the controller and the display, wherein the processing element performs the following operations:
      receive a movement input from the controller, the movement input corresponding to a body movement of the user that moves the controller;
      determine whether the body movement of the user matches an expected movement by analyzing the movement input from the controller to determine a peak vector and comparing the peak vector to an ideal vector corresponding to the expected movement, wherein if the peak vector matches the ideal vector, determining that the body movement of the user matches the expected movement, and wherein if the peak vector does not match the ideal vector, determining that the body movement of the user does not match the expected movement; and
      output to the display an indicator of whether the body movement matches the expected movement.

14. The system of claim 13, wherein the outputting operation comprises displaying an interface to the user during gameplay, the interface comprising:
- at least one icon indicating to the user a type of movement expected to be performed by the user;
- an on-screen character;
- a movement bar; and
- a designation point located on the movement bar, wherein the at least one icon scrolls across the movement bar and indicates to the user to perform the movement when the icon reaches the designation point.

15. The system of claim 13, wherein the controller generates a series of movement data points corresponding to a movement path of the controller.

16. The system of claim 15, wherein the processing element compares the series of movement data points received from the controller to a list of expected data point paths.

17. The system of claim 16, wherein the matching operation comprises determining whether a movement path corresponding to the series of movement data points received from the controller is within a predetermined threshold of at least one expected data point path.

18. The system of claim 17, wherein the predetermined threshold is an angle between the movement path and the at least one expected data point path.

19. The system of claim 17, wherein the predetermined threshold is the difference between a peak of the movement path and a peak value of the at least one expected data point path.

20. The system of claim 13, wherein the controller comprises one or more accelerometers measuring acceleration in three dimensions to provide three separate data values for the movement input from the controller.

21. The system of claim 20, wherein the processing element determines whether a magnitude of the measured acceleration in one or more dimensions is below a predetermined threshold.

22. The system of claim 21, wherein the processing element determines whether a magnitude of the measured acceleration in each dimension is below a predetermined threshold.

* * * * *